Sept. 7, 1965

T. M. McCARTY 3,204,975

CART OR CARRIAGE

Filed June 14, 1962

INVENTOR.
Theodore M. McCarty
BY
ATTORNEY.

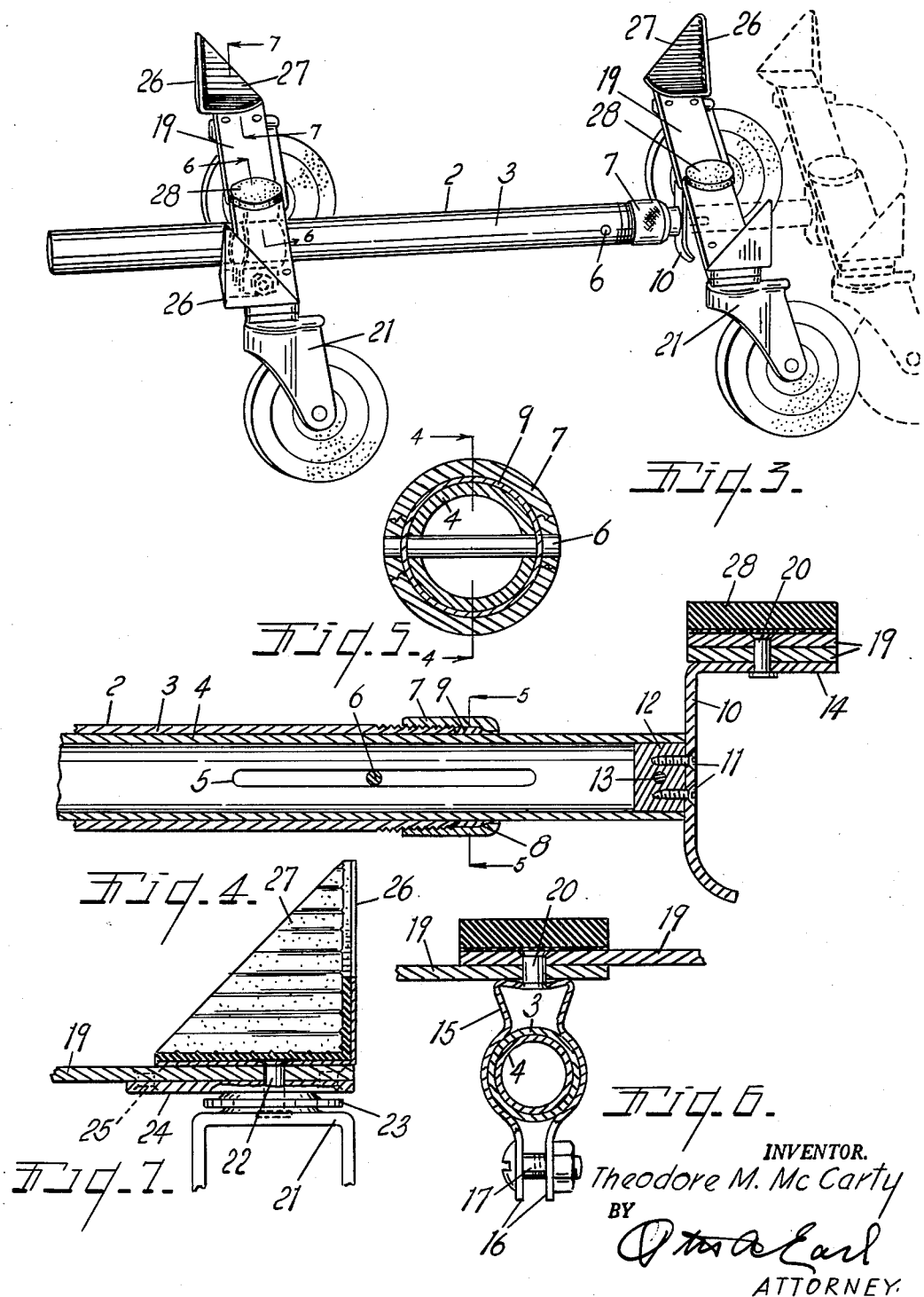

Sept. 7, 1965 T. M. McCARTY 3,204,975
CART OR CARRIAGE
Filed June 14, 1962 5 Sheets-Sheet 3

INVENTOR.
Theodore M. McCarty
BY
ATTORNEY.

Sept. 7, 1965  T. M. McCARTY  3,204,975
CART OR CARRIAGE
Filed June 14, 1962  5 Sheets-Sheet 4
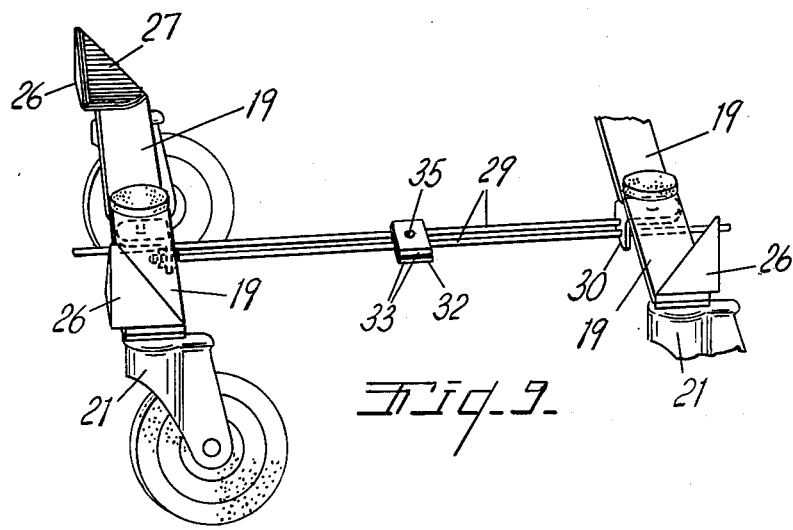
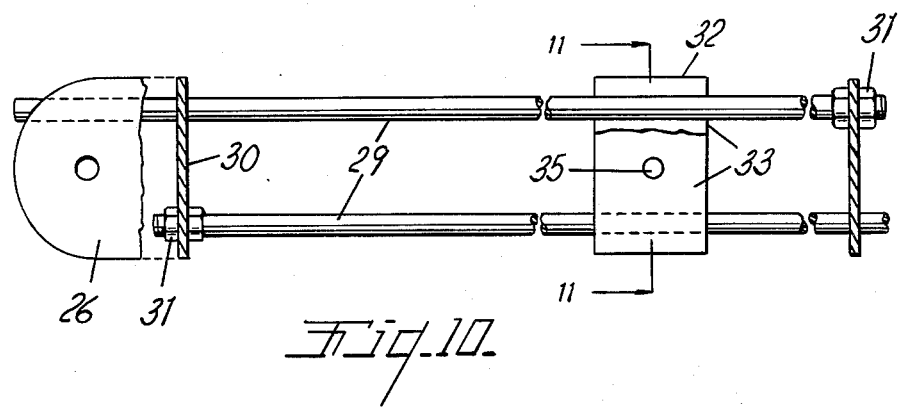
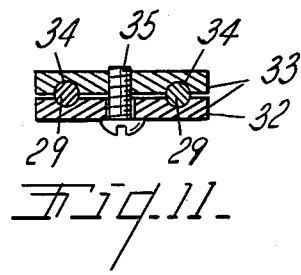
INVENTOR.
Theodore M. McCarty
BY
ATTORNEY.

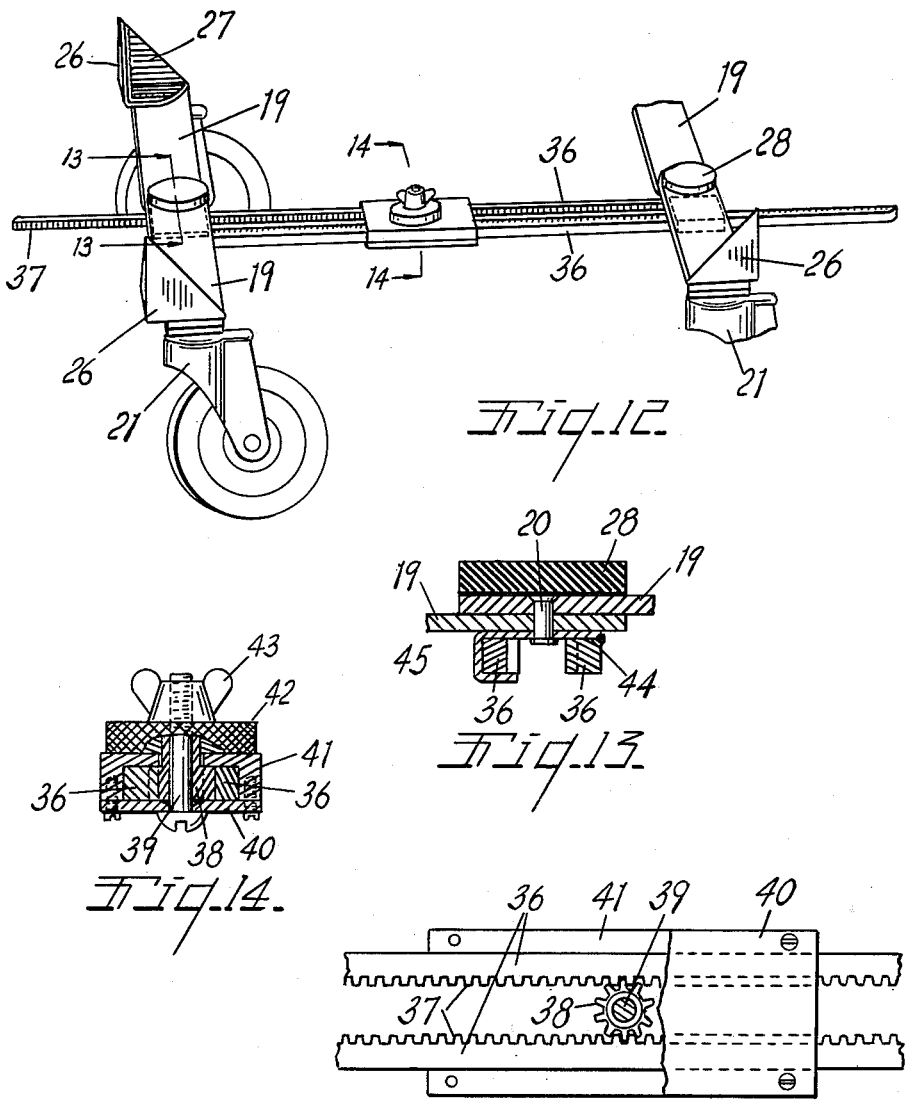

United States Patent Office 3,204,975
Patented Sept. 7, 1965

3,204,975
CART OR CARRIAGE
Theodore M. McCarty, Kalamazoo, Mich., assignor to Gibson, Inc., Kalamazoo, Mich.
Filed June 14, 1962, Ser. No. 202,499
4 Claims. (Cl. 280—35)

This invention relates to a cart or carriage which is adjustable to receive and supportingly translate objects of various sizes.

The main objects of this invention are:

First, to provide a cart or carriage which may be adjusted to fit and supportingly receive articles of varying sizes.

Second, to provide a cart or carriage which may be adjusted to clampingly engage the object supported, thereby avoiding the necessity for using screws or like fasteners.

Third, to provide an adjustable cart or carriage adapted to supportingly receive articles of various widths and lengths.

Fourth, to provide a cart or carriage having these advantages and adaptations in which the adjustments may be quickly and easily made.

Fifth, to provide a cart or carriage having these several advantages in which the load is mainly directed upon the wheels as distinguished from being on the frame parts.

Sixth, to provide a cart or carriage having these several advantages which is simple and economical in its parts and assembly thereof.

Objects relating to details and economies of the invention will appear from the description to follow. The invention is defined and pointed out in the claims. A preferred embodiment of the invention is illustrated in the accompanying drawing, in which:

FIG. 3 is a perspective view of a cart or carriage embodying my invention, one of the numerous possible adjustments thereof being indicated by dotted lines.

FIG. 4 is an enlarged fragmentary section on a line corresponding to line 4—4 of FIG. 5 and illustrating certain details of the adjustable features.

FIG. 5 is an enlarged cross sectional view on a line corresponding to line 5—5 of FIG. 4.

FIG. 6 is an enlarged fragmentary view mainly in section on a line corresponding to line 6—6 of FIG. 3.

FIG. 7 is an enlarged fragmentary view mainly in section on a line corresponding to line 7—7 of FIG. 3.

FIG. 9 is a fragmentary perspective view of a modified form or embodiment of my invention.

FIG. 10 is an enlarged fragmentary view of parts of the embodiment of my invention shown in FIG. 9, parts being broken away and other parts being shown in section.

FIG. 11 is a sectional view on a line corresponding to line 11—11 of FIG. 10.

FIG. 12 is a fragmentary perspective view of another form or embodiment of my invention.

FIG. 13 is an enlarged fragmentary view on a line corresponding to line 13—13 of FIG. 12.

FIG. 14 is an enlarged fragmentary view mainly partially in section on a line corresponding to line 14—14 of FIG. 12.

FIG. 15 is an enlarged fragmentary view of parts of the adjusting means of this embodiment of my invention.

In considering the embodiments of my invention illustrated, it should be understood that they are desirable for supporting cabinets or the like, such for example as musical instrument amplifiers and similar articles which it is desired to support for translation, but that they have various uses. It should also be understood that while the embodiments of my invention illustrated are designed to receive articles of rectangular horizontal section, the article supporting seats or holders may be shaped to supportingly receive articles of other shapes than rectangular.

Figure 1:
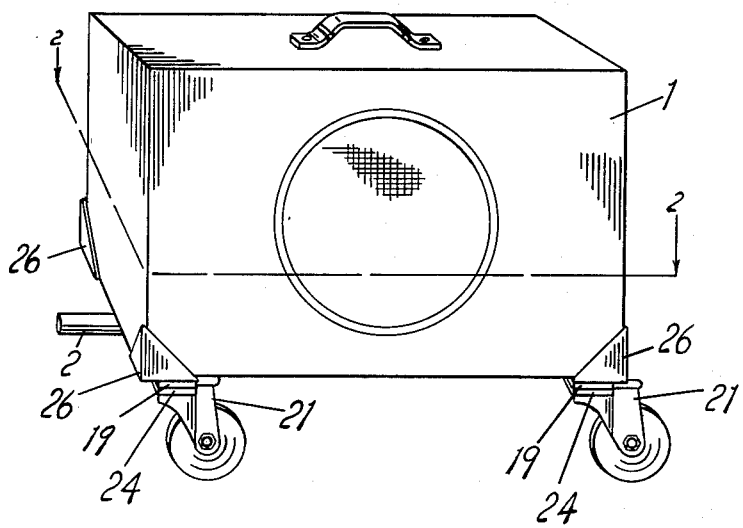
FIG. 1 is a perspective view of a cart or carriage embodying my invention conventionally shown with a musical instrument cabinet mounted thereon.
Figure 2:
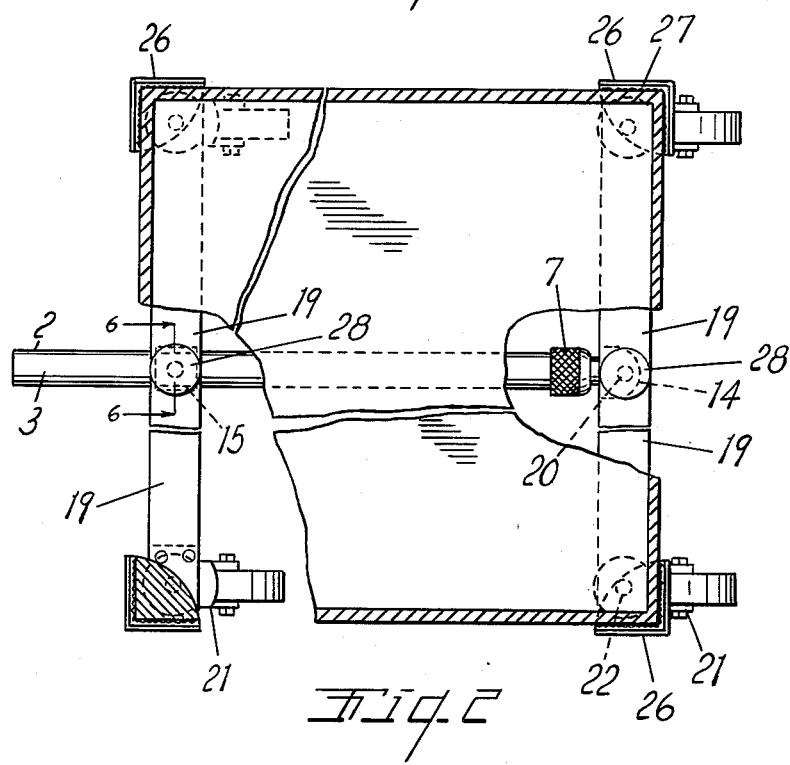
FIG. 2 is a fragmentary horizontal section on a line corresponding to line 2—2 of FIG. 1.
Figure 8:
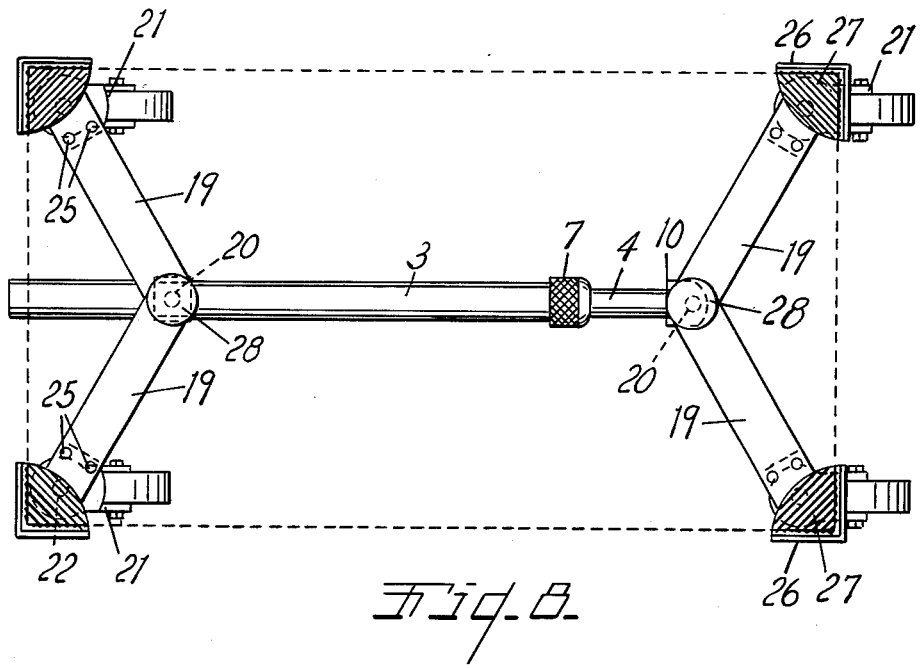
FIG. 8 is a plan view of the embodiment of my invention illustrated in FIGS. 1 to 7, a supported object being indicated by dotted lines. This figure illustrates one of the numerous possible adjustments to receive objects of varying sizes.

It should further be understood that no attempt has been made in the accompanying drawings to illustrate the very wide range of possible adjustments, one varied position of adjustment resulting from adjustment of the reach being indicated in FIG. 3, and adjustments relative to the arms supportedly connected to the reach being indicated in FIG. 8.

In the accompanying drawing, a cabinet 1 is conventionally illustrated. The embodiment of my invention shown in FIGS. 1 to 8 inclusive is adapted for various sizes of cabinets or articles to be supported, and it comprises a reach designated generally by the numeral 2, which consists of the outer tubular member 3 and the inner tubular member 4 telescopingly fitting within the outer tubular member for adjustment longitudinally therein. The reach member 4 has aligned longitudinal slots 5 therein through which the rod 6 mounted on the outer member 3 projects. The reach members in this embodiment are secured in their adjusted position by the collar or sleeve 7, which is threaded on the member 3 and has a tapered inner face 8 embracing the friction clamping member 9.

The reach member 4 is provided at its outer end with a bracket 10 fixedly secured thereto by means of screws 11 which engage the plug 12, which is in turn fixedly secured by means of the pin 13. The bracket 10 has an outwardly projecting arm 14 on which parts are mounted, as hereinafter described. The reach member 2 is provided with a bracket 15 in the form of a clamp, part of which projects upwardly from the reach as shown in FIG. 6, and has downwardly projecting arms 16 connected by the bolt 17 so that this member 15 may be adjusted longitudinally of the reach. It will be understood that this longitudinal adjustment of the reach and the adjustable mounting of the bracket 15 on the reach is for the purpose of further adapting the apparatus to support structures of widely varying dimensions.

The supporting arms 19 are duplicates disposed with their inner ends in overlapping relation and pivotally connected to each other and to the brackets on the reach by means of the pivots 20. With this arrangement, the arms may be swung to varying angular positions. As stated, only one such position is illustrated in FIG. 8 and the longitudinal adjustment of the reach is indicated in FIG. 3.

The caster wheel units, designated generally by the numeral 21, are not described as they are common forms of casters. However, it should be noted that they are pivotally connected to the outer ends of the arms 19 by the vertical pivots 22, thrust bearing members 23 being mounted on these pivots or spindles 22. The arms are also provided with reinforcing means 24 at their outer ends secured thereto by rivets indicated by dotted lines 25, see FIG. 7.

The holder members 26 are rotatably mounted on the upper ends of these pivots 22 and these are of triangular shape, the bottom portions of which are pivotally mounted on the pivots 22 and are desirably provided with rubber or like linings 27. This is for two purposes; one, to insure the gripping action on the article supported, and the other to prevent marring.

In the embodiment illustrated, resilient seat members 28 are mounted on the upper of the overlapping arms and serve the double purpose of intermediate support members for the article supported and also as covers for the pivots. With this arrangement of parts, the carriage is adapted to supportedly receive relatively heavy articles, that is, relatively heavy as compared to the carriage as such, and as stated as a wide range of adjustment for articles of varying sizes. While the structure illustrated is designed to receive rectangular articles, the carriage may be adapted to receive articles of other horizontal section and rectangular shape by properly shaping the holder members to receive them. For example, they might be adapted to support an article that is of cylindrical horizontal section.

The embodiment of my invention illustrated in FIGS. 9, 10 and 11 is also capable of a wide range of adjustment to adapt to receiving articles of varying sizes. In this embodiment the reach comprises a pair of laterally spaced rods 29 desirably formed of rod stock of uniform cross section, each rod being fixedly connected to one of the brackets 30 and slidably connected to the other bracket, the connections to the brackets being reversed. The rods at their fixed ends are clampingly secured to the brackets by the nuts 31. The arms 19 are mounted on the brackets in the same manner as in the structure illustrated in FIGS. 1 to 8 inclusive, and the same form of seat members 26 is provided. These reach members are adjustably connected to each other by means of the coupling members, designated generally by the numeral 32 and comprising a pair of clamping plates 33 having opposed rod engaging seats 34 therein, and secured in clamping engagement with the reach member rods by means of the screw 35. The reach of this embodiment performs the general function of the reach of the embodiment of FIGS. 1 to 8 inclusive and is somewhat more economical to produce, but it is not deemed as attractive in appearance.

In the embodiment of my invention illustrated in FIGS. 12 to 15 inclusive, the adjustable reach comprises a pair of reach members 36 of rectangular cross section and having rack teeth 37 on their facing inner edges, these members 36 being spaced so that the pinion 38 is in co-acting engagement therewith. This pinion is rotatably mounted on the spindle 39 which is mounted on the co-acting coupling members 40 and 41 to project upwardly therefrom. The fingerpiece 42 is fixedly connected to this spindle and a clamping nut 43 is provided on the upper end of the spindle to clampingly secure these parts in their adjusted position. One of the reach members is fixedly connected to the supporting member 44, and the other is slidably connected thereto at 45. These parts otherwise are substantially the same as those of FIGS. 9 to 11 inclusive.

I have illustrated and described my invention in highly practical embodiments thereof. As stated I have not attempted to illustrate or describe various adaptations to articles of varying sizes and adaptations in the matter of shapes, as it is believed the disclosure made will enable those skilled in the art to embody or adapt my invention as may be desired.

Having thus described the invention, what is claimed as new and desired to secure by Letters Patent is:

1. In a carriage, the combination of a reach comprising a tubular first section and a second section telescopingly adjustable within said first section and having a longitudinal slot therein, said first section having a pin disposed transversely thereof through said slot, a collar threaded upon said first section and through which said second section projects into said first section, there being a flexible clamping sleeve between said collar and said second section, said second section having a bracket fixedly connected to its outer end to project upwardly therefrom, said first section having a bracket mounted thereon for longitudinal adjustment and projecting upwardly therefrom, pairs of substantially straight article supporting arms disposed with their inner ends in overlapped relation above and pivotally connected to said brackets, wheels disposed below and connected to said arms at their outer ends, holder members pivotally mounted on said arms, said holder members being adapted to receive corner portions of a supported article, said reach members and arms being adjustable to clampingly engage the supported article.

2. In a carriage, the combination of a reach comprising a tubular first section and a second section telescopingly adjustable within said first section and having a longitudinal slot therein, said first section having a pin disposed transversely thereof through said slot, a collar threaded upon said first section and through which said second section projects into said first section, there being a flexible tubular clamping sleeve between said collar and said second section, said second section having a bracket fixedly connected to its outer end to project upwardly therefrom, said first section having a bracket mounted thereon for longitudinal adjustment and projecting upwardly therefrom, pairs of substantially straight article supporting arms of flat horizontal section disposed with their inner ends in overlapped relation above and pivotally connected to said brackets, wheels disposed below and pivotally connected to said arms at their outer ends, and article holder members pivotally mounted on said arms, said reach members and arms being adjustable to clampingly engage a supported article.

3. In a carriage, the combination of a reach comprising a tubular first section and a second section telescopingly adjustable within said first section and having a longitudinal slot therein, said first section having a pin disposed transversely thereof through said slot, means for securing said sections in their adjusted position relative to each other, said second section having a bracket fixedly connected to its outer end to project upwardly therefrom, said first section having a bracket mounted thereon for longitudinal adjustment and projecting upwardly therefrom, pairs of substantially straight article supporting arms of flat horizontal section disposed with their inner ends in overlapped relation above and pivotally connected to said brackets, wheels disposed below and pivotally connected to said arms at their outer ends and article holder members pivotally mounted on said arms, said reach members and arms being adjustable to clampingly engage a supported article.

4. In a structure of the class described, the combination of a reach of variable length comprising elongated adjustably associated sections, a bracket mounted upon each of said sections, one bracket being adjustably connected to the reach section on which it is mounted, means for securing said reach sections in their adjusted positions relative to each other, pairs of substantially straight article supporting arms disposed with their inner ends in overlapping relation to each other and to said brackets, bolts for pivotally and clampingly connecting the overlapping ends of said arms to each other and to said brackets, said arms being swingable on said bolts relative to said reach, article holders disposed above and pivotally mounted on the outer ends of said arms, and supporting wheels mounted on said arms below said article holder members.

References Cited by the Examiner

UNITED STATES PATENTS

| | | | |
|---|---|---|---|
| 439,776 | 11/90 | Gwinner | 280—35 |
| 1,853,318 | 4/32 | Peters | 280—35 |
| 2,281,680 | 5/42 | De Ment | 280—35 X |

A. HARRY LEVY, *Primary Examiner.*

PHILIP ARNOLD, LEO FRIAGLIA, *Examiners.*